United States Patent
Honjoh et al.

(10) Patent No.: US 7,953,363 B2
(45) Date of Patent: May 31, 2011

(54) LUBRICANT APPLICATOR AND IMAGE FORMING APPARATUS INCLUDING SAME

(75) Inventors: Kenji Honjoh, Yokohama (JP); Toshiya Satoh, Atsugi (JP); Hiroyuki Nagashima, Yokohama (JP); Fumihito Itoh, Kawasaki (JP); Hiroshi Ono, Ohta-ku (JP); Ken Amemiya, Nerima-ku (JP); Masahiko Shakuto, Zama (JP); Toshio Koike, Machida (JP); Yuji Arai, Kawasaki (JP); Nobuo Kuwabara, Yokohama (JP); Michiya Okamoto, Zama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/571,640

(22) Filed: Oct. 1, 2009

(65) Prior Publication Data

US 2010/0021205 A1    Jan. 28, 2010

(30) Foreign Application Priority Data

Oct. 9, 2008   (JP) ................................ 2008-262766

(51) Int. Cl.
    *G03G 21/00*    (2006.01)
(52) U.S. Cl. ........................................ 399/346; 399/349
(58) Field of Classification Search .................. 399/346, 399/349
    See application file for complete search history.

(56) References Cited

U.S. PATENT DOCUMENTS

| | | | | |
|---|---|---|---|---|
| 7,313,356 | B2 * | 12/2007 | Koyama | 399/349 |
| 7,486,916 | B2 | 2/2009 | Tsuda et al. | 399/258 |
| 2007/0036595 | A1 * | 2/2007 | Amemiya et al. | 399/346 |
| 2007/0122217 | A1 | 5/2007 | Nagashima et al. | 399/346 |
| 2007/0209877 | A1 | 9/2007 | Arai et al. | 184/3.2 |
| 2008/0118285 | A1 * | 5/2008 | Karasawa | 399/346 |
| 2009/0060600 | A1 * | 3/2009 | Ninomiya et al. | 399/346 |
| 2009/0185842 | A1 * | 7/2009 | Hatori et al. | 399/346 |
| 2009/0241830 | A1 * | 10/2009 | Koike et al. | 118/258 |

FOREIGN PATENT DOCUMENTS

| | | |
|---|---|---|
| JP | 7-334054 | 12/1995 |
| JP | 2002-207397 | 7/2002 |
| JP | 2006-201455 | 8/2006 |
| JP | 2006-251751 | 9/2006 |
| JP | 2007-127811 | 5/2007 |
| JP | 2007-178970 | 7/2007 |
| JP | 2007-212979 | 8/2007 |

* cited by examiner

*Primary Examiner* — Sophia S Chen

(74) *Attorney, Agent, or Firm* — Oblon, Spivak, McClelland, Maier & Neustadt, L.L.P.

(57) ABSTRACT

A lubricant applicator includes a solid mold lubricant, a lubricant application roller, and a flicker member. The lubricant application roller scrapes and applies the lubricant to an image bearing member. The flicker member removes a powder substance adhered to the surface of the lubricant application roller and is disposed upstream of the solid mold lubricant in a direction of rotation of the lubricant application roller. The lubricant application roller, the flicker member, and the solid mold lubricant define a sealed space therebetween. A lubricant applicator includes the solid mold lubricant, the lubricant application roller, the flicker member, and an adherence prevention member that prevents the substance removed by the flicker member from adhering again to the lubricant application roller. A lubricant applicator includes the solid mold lubricant, the lubricant application roller, and a lubricant receiver that receives the scraped lubricant from the lubricant application roller.

19 Claims, 12 Drawing Sheets

FIG. 11
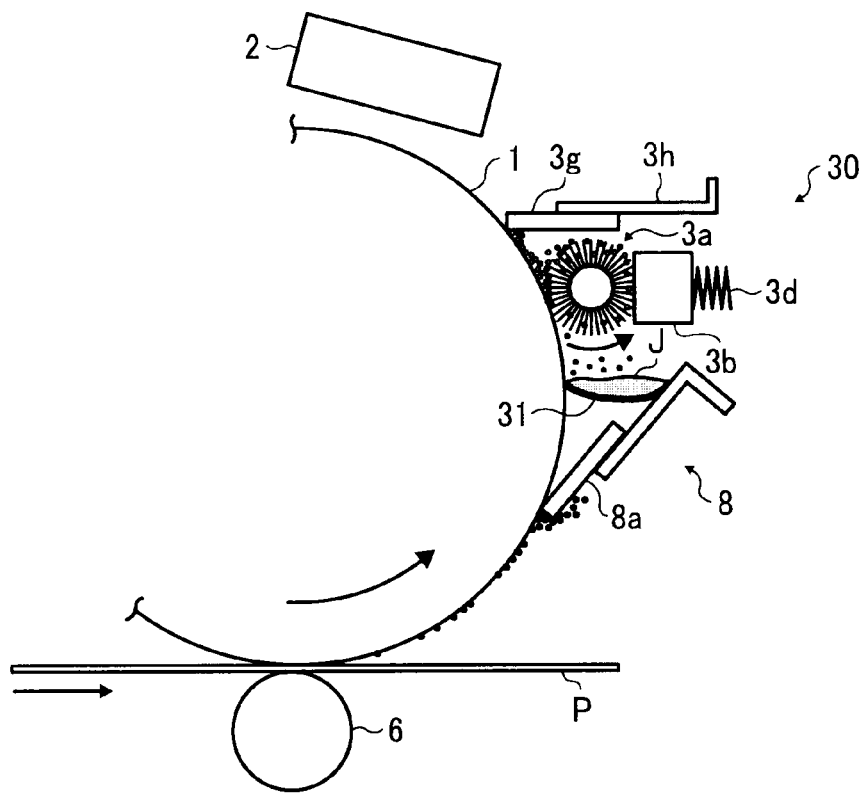
FIG. 12A        FIG. 12B        FIG. 12C
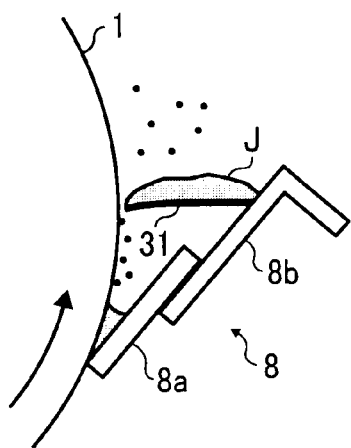   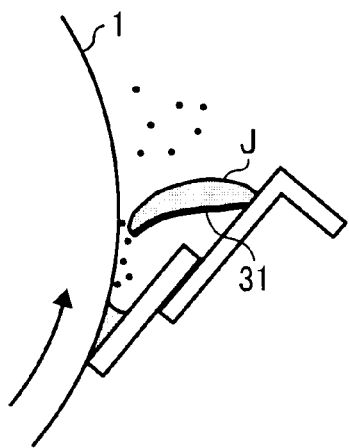   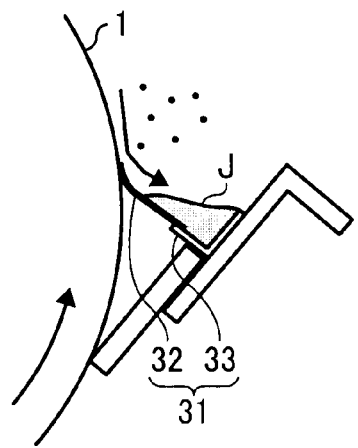

APPLYING LUBRICANT　　　　　　SCRAPING LUBRICANT

LUBRICANT APPLICATOR AND IMAGE FORMING APPARATUS INCLUDING SAME

CROSS-REFERENCE TO RELATED APPLICATIONS

This patent application is based on and claims priority pursuant to 35 U.S.C. §119 from Japanese Patent Application No. 2008-262766, filed on Oct. 9, 2007 in the Japan Patent Office, which is hereby incorporated herein by reference in its entirety.

BACKGROUND OF THE INVENTION

1. Field of the Invention

Exemplary aspects of the present invention generally relate to a lubricant applicator, a process cartridge including the lubricant applicator, and an image forming apparatus including same.

2. Description of the Background Art

With image forming apparatuses such as copiers, printers, facsimile machines and the like, there is increasing market demand for high-quality imaging. In particular, in order to obtain high-resolution color images, efforts to reduce a diameter of particles of toner used to form images and make the toner particles more spherical are being pursued.

Toner particles of substantially small diameter enhance the resolution of the image. At the same time, conglobation of the toner particles improves developability and transferability. One problem, however, is that it is difficult to produce small-diameter spherical toner particles with a known kneading pulverization method. Thus, polymerized toner manufactured by toner manufacturing methods such as a suspension polymerization method, an emulsion polymerization method, and a dispersion polymerization method began to be used.

Although advantageous, such small-diameter spherical toner has a drawback in that it complicates cleaning of a photoreceptor after an image forming operation, as the following discussion explains.

One known method of removing the toner from the photoreceptor and thus cleaning the photoreceptor involves use of a cleaning blade. However, use of small-diameter spherical toner makes it difficult to remove the toner with the cleaning blade because the cleaning blade removes the toner and the like while slidably contacting the surface of the photoreceptor. This sliding contact or scraping action causes deformation of an edge portion of the cleaning blade due to friction resistance with the photoreceptor, and can result in breaking the contact between the blade and the photoreceptor, thereby undesirably forming a gap between the photoreceptor and the cleaning blade. As a result, a certain amount of the toner slips through the gap between the photoreceptor and the cleaning blade. If the amount of toner slips from the cleaning blade is large enough, it can cause abnormal imaging including fogging, etc.

Furthermore, when the toner slips past the cleaning blade, the toner keeps accumulating on the surface of the photoreceptor, and a release agent and a fluidizing agent in the toner adhere to the surface of the photoreceptor in the form of a membrane or film. This phenomenon is known as filming. When such filming occurs, an abnormal image is formed, in which, for example, a solid portion of an image may include white spots.

To counteract such problems, a method for reducing a friction coefficient of the surface of the photoreceptor has been proposed to improve cleaning performance of the cleaning blade relative to the surface of the photoreceptor.

In this related-art method, a thin film is formed on the photoreceptor by applying a lubricant formed of metal salts of fatty acids or the like to the surface of the photoreceptor to reduce the friction coefficient of the surface of the photoreceptor is reduced. When the friction coefficient of the surface of the photoreceptor is reduced, adhesion between the photoreceptor and the toner is reduced, thereby improving the cleaning performance of the cleaning blade while suppressing filming.

Typically, a lubricant applicator in the form of a brush or the like is used to apply the lubricant to the photoreceptor. However, in a case in which an image having a relatively high image area ratio is printed continuously, when a large amount of toner adheres to the lubricant application brush, the lubricant sticks to the toner on the brush, thereby preventing the lubricant from being supplied to the surface of the photoreceptor even if the lubricant application brush frictionally contacts the lubricant. Thus, it is advantageous to minimize the amount of toner adhered to the surface of the lubricant application brush when the lubricant application brush scrapes the lubricant.

In view of the above, one related-art approach disposes the lubricant applicator downstream of the cleaning blade. With this configuration, the cleaning blade cleans residual toner remaining on the photoreceptor after a transfer process so that the lubricant can be applied to the surface of the photoreceptor without being affected by previous imaging. However, in order to apply the lubricant, a smoothing member is necessary, thereby complicating efforts to reduce the size and the cost of the image forming apparatus.

By contrast, in another related-art approach, the lubricant applicator such as an application brush is provided upstream of the cleaning blade and applies a solid lubricant to the photoreceptor. However, with this configuration the toner remains on the application brush, preventing the lubricant from being applied effectively to the photoreceptor.

In still another related-art approach, a lubricant applicator or application roller such as a brush roller or a sponge roller applies a lubricant formed generally of zinc stearate to the photoreceptor serving as an image bearing member and to an intermediate transfer belt in an effort to improve overall transferability including cleaning performance, extend product life of the photoreceptor and the intermediate transfer belt, and prevent image transfer failure.

In particular, the application roller is rotatably provided on an image bearing surface of the image bearing member such that the peripheral surface of the image bearing member evenly contacts the application roller. The application roller rotates together with rotation of the image bearing member. Alternatively, when the application roller rotates, the lubricant contacts the application roller at a predetermined pressure. In this case, the lubricant is pressed against the application roller by its own weight or by a spring force of a spring, thereby securing a predetermined contact pressure in order to acquire the lubricant and apply it to the surface of the photoreceptor.

However, when a solid lubricant is pressed against the application roller, the lubricant is turned into a powder. Then, the application roller contacting the image bearing member applies a powdered lubricant to the image bearing member. Moreover, the solid lubricant is urged by its own weight or by the spring to secure the predetermined pressure. Thus, the lubricant is always supplied in powder form to the image bearing member. Accordingly, regardless of the state of the image bearing member, a certain amount of the powder lubricant is always supplied. Consequently, depending on the state of the image bearing member, some of the powder lubricant scraped off from the solid lubricant may not be applied to the image bearing member but instead accumulates in a cleaning unit, on the cleaning blade or in the application roller in the cleaning unit. As a result, upon maintenance, such powder lubricant scatters and falls off. When the powder lubricant accumulates on the cleaning blade, the accumulated lubricant presses the cleaning blade. Depending on the amount of accumulation, the amount of pressure of the cleaning blade pressing the image bearing member changes undesirably, causing degradation of cleaning performance.

In one example of removing the toner adhered to the lubricant application brush, a flicker member is employed to remove toner from the brush. However, the flicker member is insufficient because, after the toner is removed from the brush by flicking, the toner sticks again to the brush due to airflow.

In order to facilitate an understanding of the related art and of the novel features of the present invention, with reference to FIGS. 3 and 4, a function of a flicker member of a related-art lubricant applicator is described. FIG. 3 is a partially enlarged view of the related-art lubricant applicator. FIG. 4 is a diagram conceptually illustrating the function of the flicker of the related-art lubricant applicator.

In FIGS. 3 and 4, substantially below a brush roller 203a, a flicker 209 is disposed so as to contact the brush roller 203a. The flicker 209 is formed of a stainless steel stick or the like and disposed upstream from a solid lubricant 203b in the direction of rotation of the brush roller 203a. Accordingly, a gap 210 is formed between the flicker 209 and the solid lubricant 203b, allowing toner T removed from the brush roller 203a by the flicker 209 to stick again to the brush roller 203a due to airflow or the like, thus hindering the lubricant from adhering to the brush roller 203a as the solid lubricant 203b and the brush roller 203a slidably contact each other.

In other words, because the brush roller 203a bears the toner T, it is difficult for the brush roller 203a to carry the lubricant in powder form, as indicated by a dotted oval in FIG. 4. As a result, the brush roller 203a cannot adequately supply the lubricant to the surface of the photoreceptor.

SUMMARY OF THE INVENTION

In view of the foregoing, in one illustrative embodiment of the present invention, a lubricant applicator includes a solid mold lubricant, a lubricant application roller, and a flicker member. The lubricant application roller scrapes and applies the lubricant to an image bearing member. The flicker member removes a powder substance adhered to the surface of the lubricant application roller and is disposed upstream of the solid mold lubricant in a direction of rotation of the lubricant application roller. The lubricant application roller, the flicker member, and the solid mold lubricant define a sealed space therebetween.

In another illustrative embodiment of the present invention, a lubricant applicator includes the solid mold lubricant, the lubricant application roller, the flicker member, and an adherence prevention member. The adherence prevention member prevents the substance removed by the flicker member from adhering again to the lubricant application roller and is disposed between the flicker member and the solid mold lubricant.

Yet in another illustrative embodiment of the present invention, a lubricant applicator includes the solid mold lubricant, the lubricant application roller, and a lubricant receiver. The lubricant receiver receives the scraped lubricant from the lubricant application roller to regulate accumulation of the lubricant and is disposed substantially below the lubricant application roller.

Additional features and advantages of the present invention will be more fully apparent from the following detailed description of illustrative embodiments, the accompanying drawings and the associated claims.

BRIEF DESCRIPTION OF THE DRAWINGS

A more complete appreciation of the disclosure and many of the attendant advantages thereof will be readily obtained as the same becomes better understood by reference to the following detailed description of illustrative embodiments when considered in connection with the accompanying drawings, wherein:

FIG. 11 is a cross-sectional view of a second embodiment of the present invention;

FIGS. 12A through 12C are schematic diagrams illustrating comparative examples of a lubricant receiver;

DETAILED DESCRIPTION OF ILLUSTRATIVE EMBODIMENTS

Figure 1:
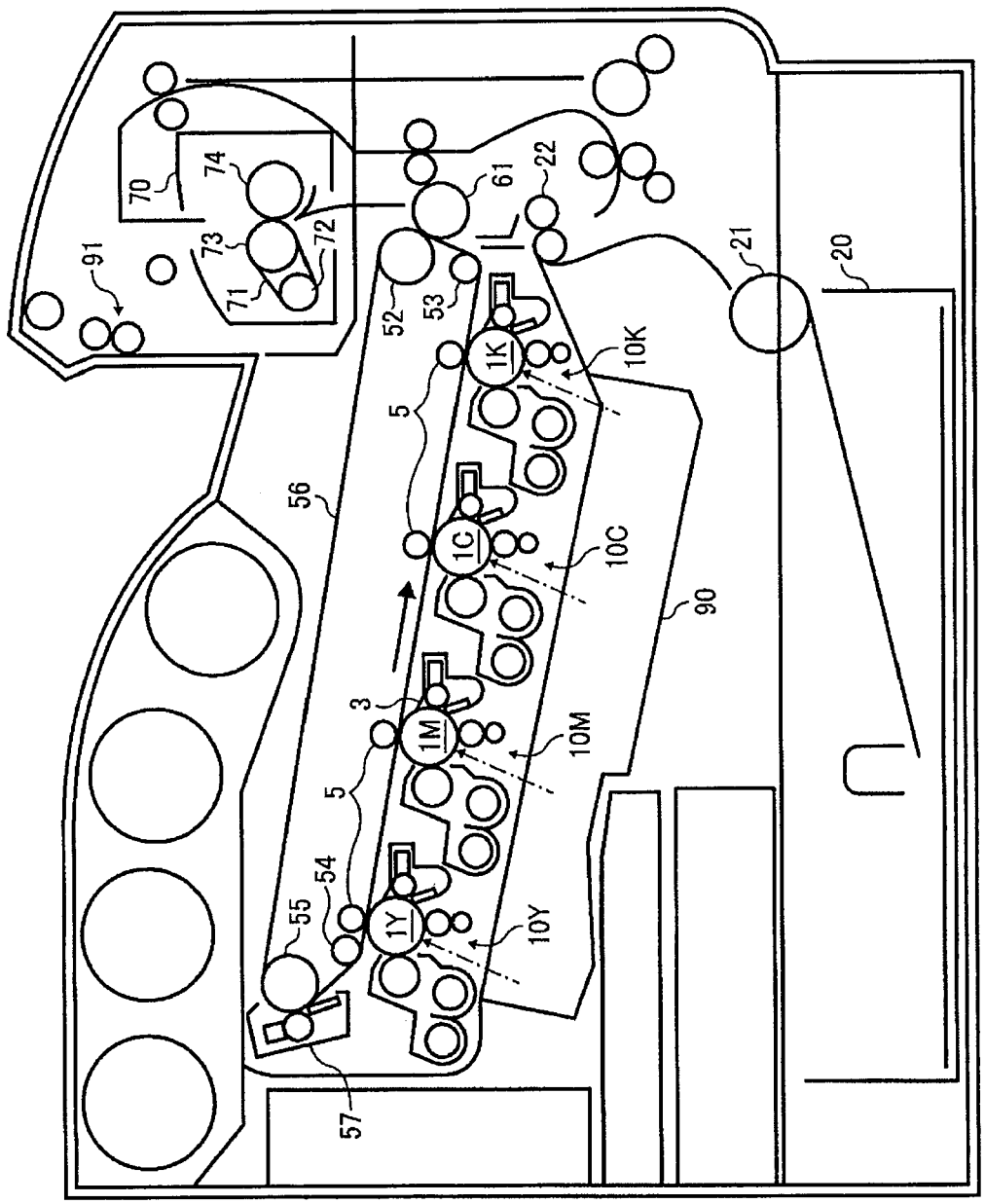
FIG. 1 is a cross-sectional view of a color printer as an example of an image forming apparatus according to an illustrative embodiment of the present invention.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Illustrative embodiments of the present invention are now described below with reference to the accompanying drawings.

In a later-described comparative example, illustrative embodiment, and alternative example, for the sake of simplicity of drawings and descriptions, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but includes other printable media as well.

Referring now to the drawings, wherein like reference numerals designate identical or corresponding parts throughout the several views, and initially to FIG. 1, one example of an image forming apparatus according to an illustrative embodiment of the present invention is described.

FIG. 1 is a cross-sectional view of a color printer as one example of the image forming apparatus according to the illustrative embodiment of the present invention. In FIG. 1, the image forming apparatus is a tandem-type color printer capable of forming a full-color image. As illustrated in FIG. 1, substantially at the center of the image forming apparatus, four image forming units or process cartridges 10Y, 10M, 10C, and 10K are disposed. The image forming units 10Y, 10M, 10C, and 10K are arranged along a bottom surface of an intermediate transfer belt 56 and include photoreceptor drums 1Y, 1M, 1C, and 1K.

The intermediate transfer belt 56 is wound around support rollers 52 through 55 and rotated in a counterclockwise direction. In an inner loop of the intermediate transfer belt 56, intermediate transfer rollers 5 are provided facing the photoreceptor drums 1Y, 1M, 1C, and 1K. A belt cleaning unit 57 for cleaning the intermediate transfer belt 56 is provided outside the belt loop opposite the support roller 55 at the left.

The image forming units 10Y, 10M, 10C, and 10K all have the same configuration, differing only in the color of toner employed. It is to be noted that reference characters Y, M, C, and K denote the colors yellow, magenta, cyan, and black, respectively. To simplify the description, the reference characters Y, M, C, and K indicating colors are omitted herein unless otherwise specified.

Figure 2:
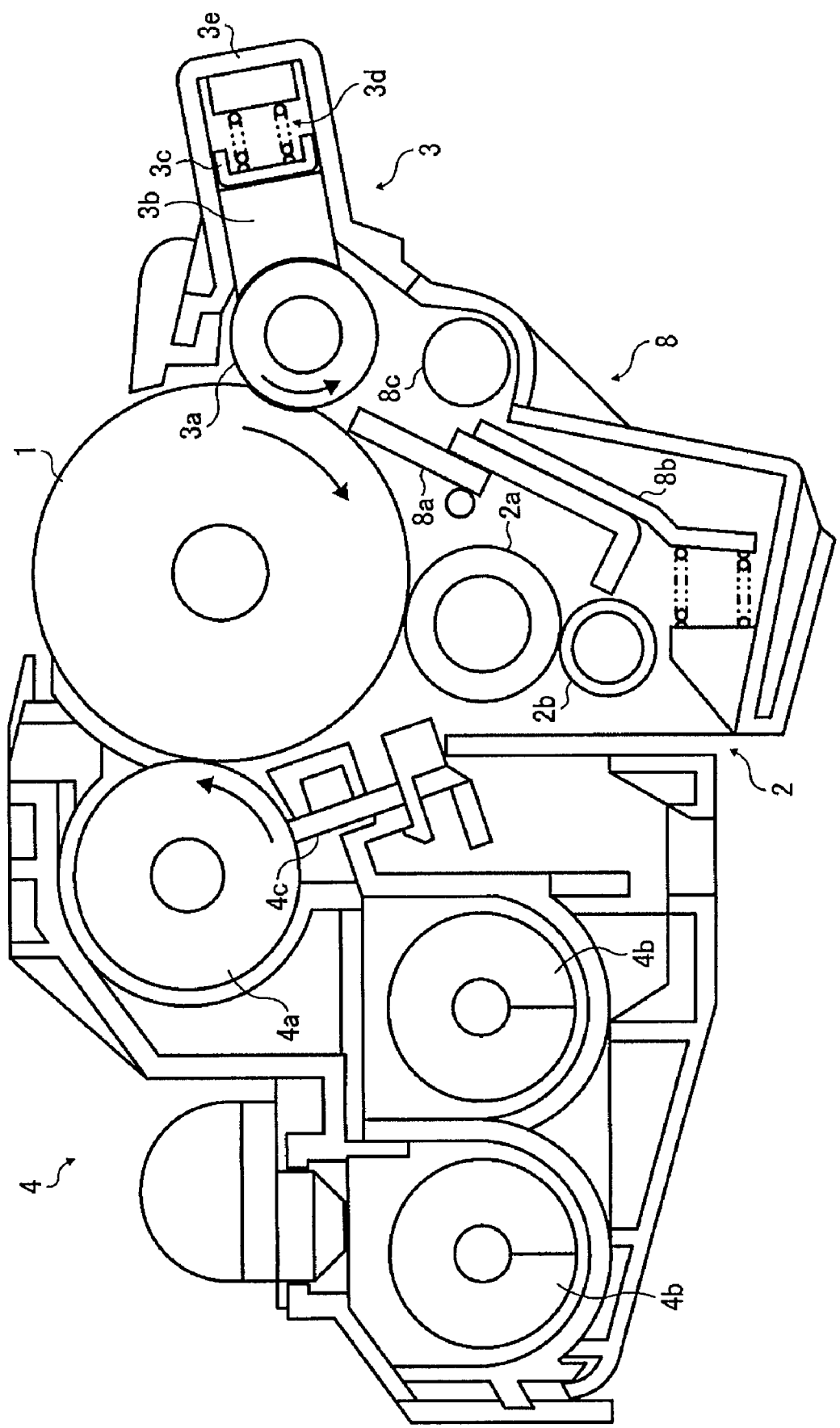
FIG. 2 is a cross-sectional view of an image forming unit of the image forming apparatus of FIG. 1.
Figure 3:
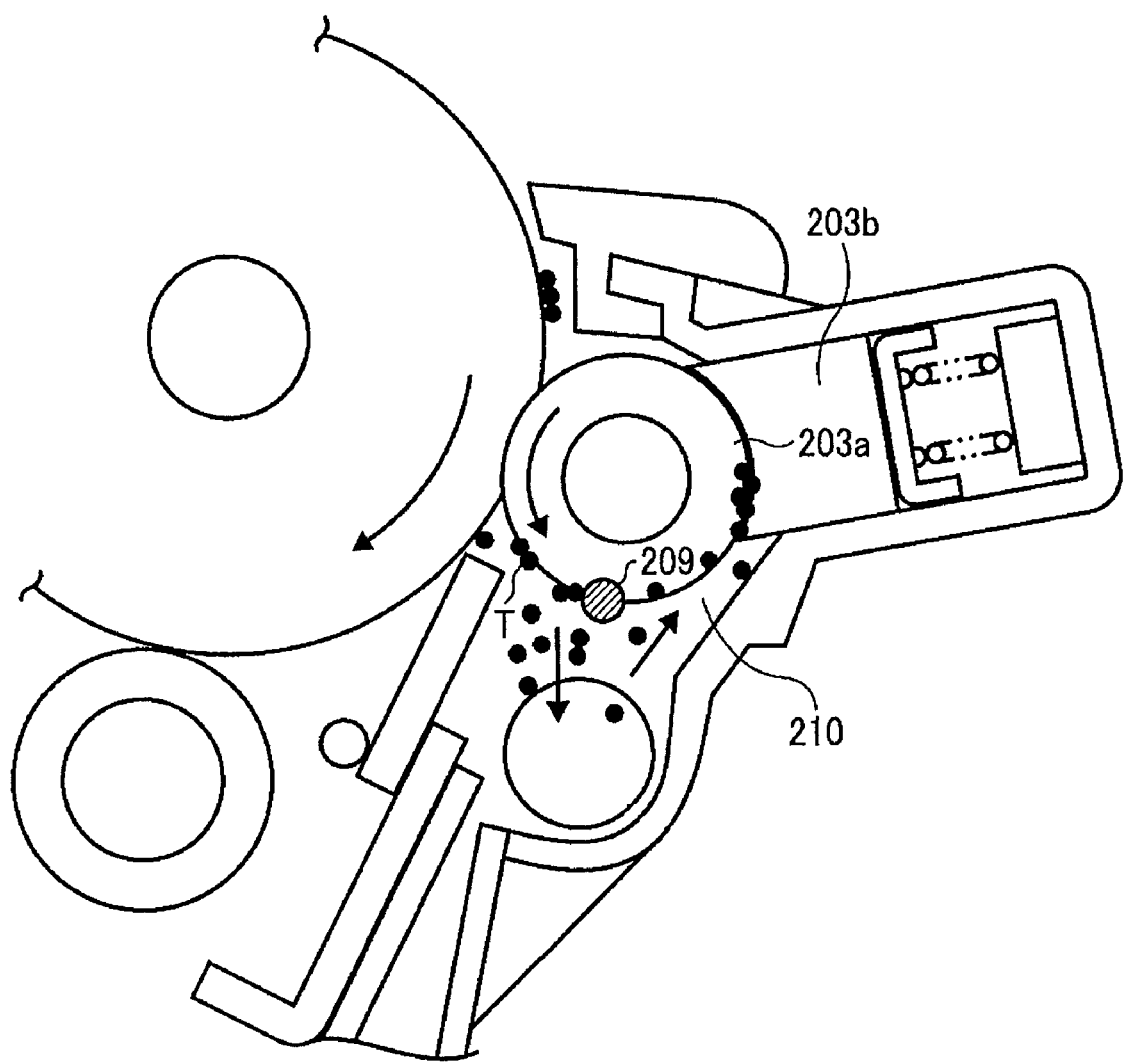
FIG. 3 is a partially enlarged view of a related-art lubricant applicator.
Figure 4:
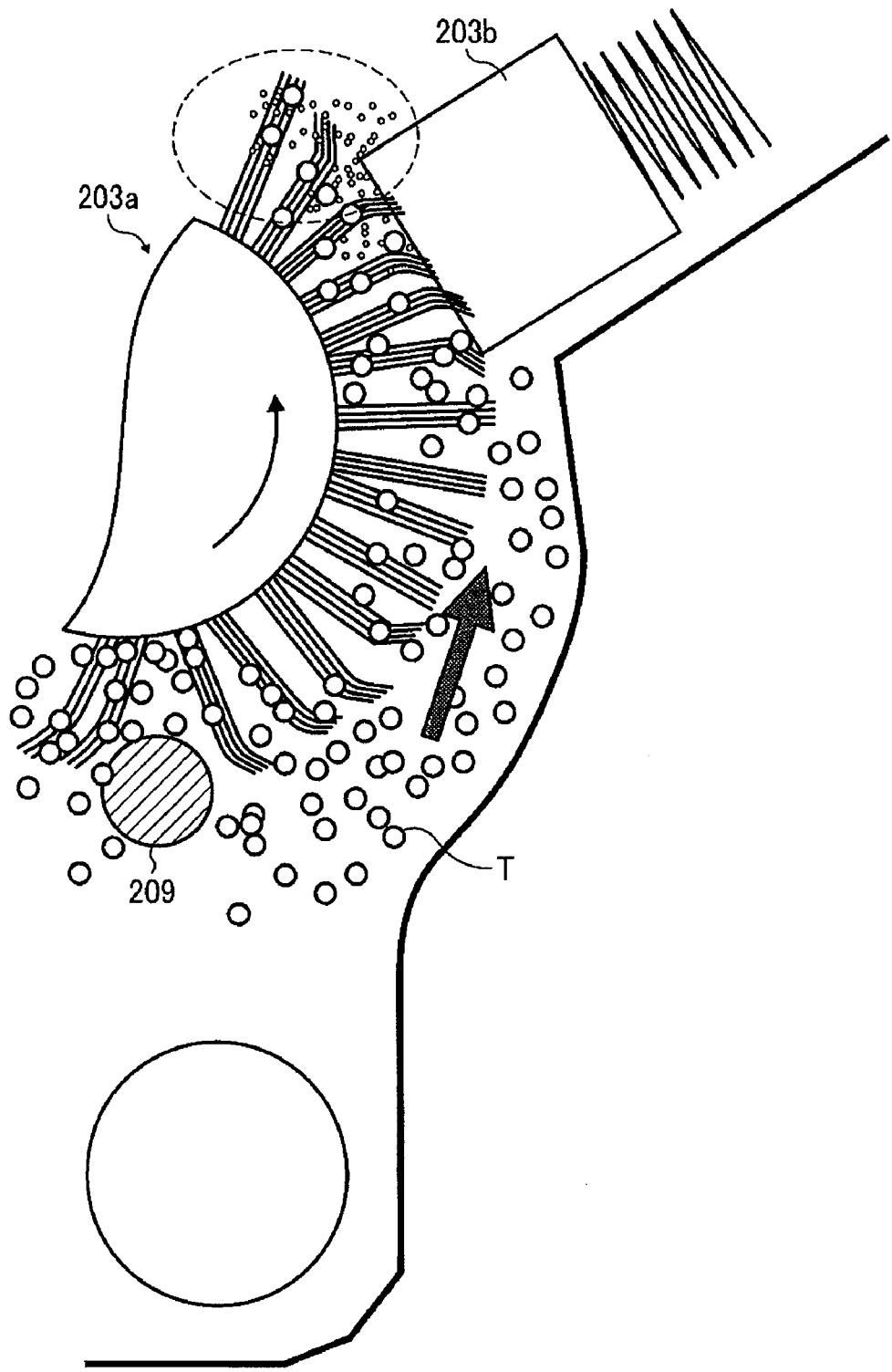
FIG. 4 is another partially enlarged view of the related-art lubricant applicator for explaining a function of a flicker.

FIG. 2 illustrates a representative example of the image forming units 10. FIG. 2 is a cross-sectional view of the image forming unit 10 of the color image forming apparatus. As illustrated in FIG. 2, the image forming unit 10 includes the photoreceptor drum 1 serving as an image bearing member. Around the photoreceptor drum 1, a charging device 2, a developing device 4, a lubricant applicator 3, a cleaning device 8, and so forth are provided. Each of the image forming units 10 is detachably mountable as a process cartridge relative to the main body of the image forming apparatus.

The charging device 2 includes a charging roller 2a serving as a charging member. The charging roller 2a is connected to a power source, not illustrated, and supplied with a predetermined voltage. A charging cleaning member 2b is provided to the charging roller 2a. The charging cleaning member 2b contacts the surface of the charging roller 2a to clean.

The developing device 4 includes a developing sleeve 4a opposite the photoreceptor drum 1. Two screws 4b are provided substantially obliquely below the developing sleeve 4a.

A thickness of developer consisting of toner and magnetic carrier is regulated by a doctor blade 4c to a predetermined thickness, thereby forming a developer layer. The developer is carried by the developing sleeve 4a. It is to be noted that the developing device 4 according to the illustrative embodiment uses a two-component developer. However, the present invention is not limited to the two-component developer. Alternatively, a one-component developer can be used.

Although a detailed-description will be provided later, the lubricant applicator 3 according to the illustrative embodiment reliably and adequately supplies and applies the lubricant to the image bearing member so that cleaning failure relative to the photoreceptor drum 1 serving as the image bearing member can be prevented. Accordingly, high imaging quality can be achieved.

In particular, when a circularity of the toner is equal to or greater than 0.95, a high-resolution image can be formed. In such a case, or in a case of using a toner having a circularity that poses a difficulty in cleaning the photoreceptor drum, the high resolution image can be formed over time.

The cleaning device 8 includes a cleaning blade 8a, a support member 8b, and a waste toner conveyance screw 8c. The cleaning blade 8a is formed of rubber such as urethane rubber and silicone rubber having a plate shape. The edge of the cleaning blade 8a contacts the surface of the photoreceptor drum 1, thereby removing toner remaining on the photoreceptor drum 1 after transfer process.

Referring back to FIG. 1, substantially below the tandem image forming portion in which four image forming units 10 are arranged, an optical writing unit 90 is provided. The optical writing unit 90 includes a polygon mirror and a group of mirrors, not illustrated, and illuminates the surface of the photoreceptor drum 1 of each of the image forming units with a laser beam that is optically modulated.

At the bottom the image forming apparatus, a sheet feed tray 20 is provided. The sheet feed tray 20 stores a stack of recording media sheets. At the right of the sheet feed tray 20, a sheet feed roller 21, and a separation member, not illustrated, are disposed. The sheet feed roller 21 feeds the recording medium from the sheet feed tray 20.

Substantially above the sheet feed roller 21 (at the downstream side in the direction of sheet transport), a pair of registration rollers 22 is provided. Substantially above the registration rollers 22, a transfer roller 61 serving as a secondary transfer member is provided facing an opposing roller 52, thereby forming a secondary transfer portion.

Substantially above the secondary transfer portion, a fixing unit 70 is provided. The fixing unit 70 according to the illustrative embodiment includes a fixing belt 71, a heating roller 72, a fixing roller 73, and a pressure roller 74. The fixing belt 71 is wound around and stretched between the heating roller 72 and the fixing roller 73. The pressure roller 74 pressingly contacts the heating roller 73 through the fixing belt 71. The fixing unit 70 applies heat and pressure to the recording medium on which an unfixed toner image is transferred in the secondary transfer portion, thereby fixing the toner image on the recording medium.

Obliquely above the fixing unit 70, a sheet discharge roller 91 is provided. The sheet discharge roller 91 discharges the recording medium onto a sheet discharge tray provided on the upper surface of the image forming apparatus after fixing.

A description is now provided of an image forming operation in the image forming apparatus, for example, a color printer. The image forming units 10Y through 10K have the same configuration, differing only in the color of toner employed. Thus, a description is provided of one of the image forming units as a representative example.

The charging device 2 shown in FIG. 2 uniformly charges the photoreceptor drum to a predetermined polarity while the photoreceptor drum 1 of the image forming unit 10 is rotated by a driving mechanism in a clockwise direction. The optical writing unit 90 illuminates the surface of the charged photoreceptor drum 1 with a laser beam, thereby forming an electrostatic latent image on the surface of the photoreceptor drum 1.

Image information exposed on each of the photoreceptor drums 1 includes single color information in which a full color image is decomposed into color information of yellow, magenta, cyan, and black. The developing device 4 supplies the electrostatic latent image with toner of each color, thereby forming a visible image, known as a toner image.

The toner images of each color are overlappingly transferred onto the intermediate transfer belt 56 by the primary transfer rollers 5 while the intermediate transfer belt 56 is rotated in the counterclockwise direction. Accordingly, the surface of the intermediate transfer belt 56 carries a full-color composite toner image.

Alternatively, one of the image forming units 10 is used to form a single-color image, or an image of two or three colors. When forming a monochrome image, the image forming unit 10K at the right end in FIG. 1 is used.

The residual toner adhered to the surface of the photoreceptor drum 1 after the toner image is transferred is removed therefrom by the cleaning device 8. Subsequently, the surface potential of the surface of the photoreceptor drum 1 is initialized by a charge neutralizing device in preparation for the subsequent imaging cycle.

The recording medium is fed from the sheet feed tray 20. The pair of the registration rollers 22 sends the recording medium to the secondary transfer position in appropriate timing such that the recording medium is aligned with the toner image formed on the intermediate transfer belt 56.

According to the illustrative embodiment, a transfer voltage of a polarity opposite a charging polarity of the toner image on the intermediate transfer belt 56 is supplied to the secondary transfer roller 61. Accordingly, the toner image on the surface of the intermediate transfer belt 56 is transferred onto the recording medium at once.

After the toner image is transferred onto the recording medium, when passing the fixing unit 70, heat and pressure are applied to the recording medium so that the toner image is fused and fixed on the recording medium. After fixation, the recording medium is discharged onto the sheet discharge tray provided on the upper surface of the image forming apparatus main body by the sheet discharge roller 91.

As illustrated in FIG. 2, the residual toner remaining on the photoreceptor drum 1 is cleaned by the cleaning device 8. The residual toner remaining on the intermediate transfer belt 56 is cleaned by the belt cleaning unit 57. The waste toner is discharged from the process cartridge by the waste toner conveyance screw 8c of the cleaning unit 8 to a waste toner bottle, not illustrated, provided to the image forming apparatus.

Next, a description is provided of the lubricant applicator 3. As illustrated in FIG. 2, the lubricant applicator 3 includes a frame 3e, a solid lubricant (mold lubricant) 3b, and a lubricant application roller 3a. The solid lubricant 3b is stored in within the frame 3e of the lubricant applicator 3. The lubricant application roller 3a contacts and scrapes the solid lubricant, and then applies the scraped lubricant to the photoreceptor drum 1.

The lubricant application roller 3a includes a brush roller or a sponge roller. Conventionally, the brush roller is commonly used.

The solid lubricant 3b includes, but is not limited to fatty acid metal salts and fluorocarbon resin. Specifically, fatty acid metal salts are preferable. Specific examples of fatty acid metal salts include straight-chain hydrocarbons, such as, myristic acid, palmitic acid, stearic acid, and oleic acid, etc. Specific examples of the metals include lithium, magnesium, calcium, strontium, zinc, cadmium, aluminum, cerium, titanium, magnesium stearate, aluminum stearate, and iron stearate etc. Zinc stearate is particularly preferable.

The solid lubricant 3b formed of the fatty acid metal salts formed in a rectangular shape is fixed to a lubricant holder 3c by a double-sided tape or an adhesive. The lubricant holder 3c includes a plurality of pressure members 3d relative to a longitudinal direction. The pressure members 3d urge the sold lubricant 3b against the lubricant application roller 3a. As the pressure members 3d, a compression spring is often used. Depending on weight, the pressure members 3d are pressed in a vertical direction.

Embodiment 1

Figure 5:
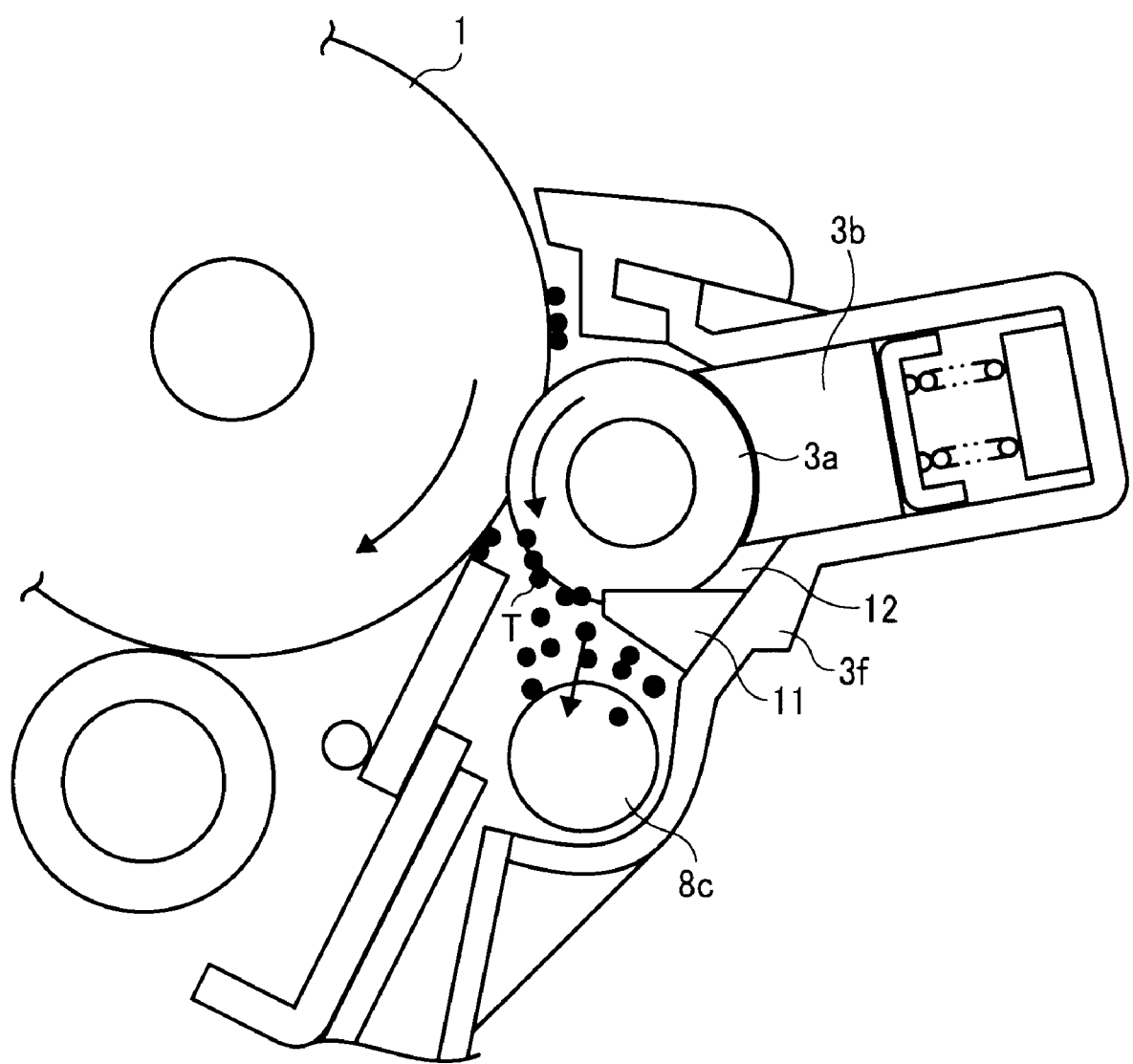
FIG. 5 is a cross-sectional view of a lubricant applicator according to a first embodiment of the present invention.

Referring now to FIG. 5, there is provided a cross-sectional view illustrating the lubricant applicator according to the illustrative embodiment of the present invention.

According to the present embodiment, substantially below the brush roller 3a, a triangular flicker 11 is provided. The base portion of the flicker 11 is attached to a housing 3f of the lubricant applicator 3. The tip portion as well as the upper surface of the flicker 11 contact the brush roller 3a. With this configuration, the brush 3a, the flicker 11, and the solid lubricant 3b define a sealed space 12 therebetween. Therefore, the toner T removed from the brush roller 3a by the flicker 11, indicated by dots in FIG. 5, is prevented from sticking again to the brush roller 3a due to airflow and the like. The brush roller 3a is always free from the toner T by the flicker 11 and can reliably scrape and supply the solid lubricant 3b to the photoreceptor drum 1.

The flicker 11 of the present embodiment serves as both the flicker that removes the toner T from the brush roller 3a and an adherence prevention member that prevents the removed toner from adhering again to the brush roller 3a.

Figure 6:
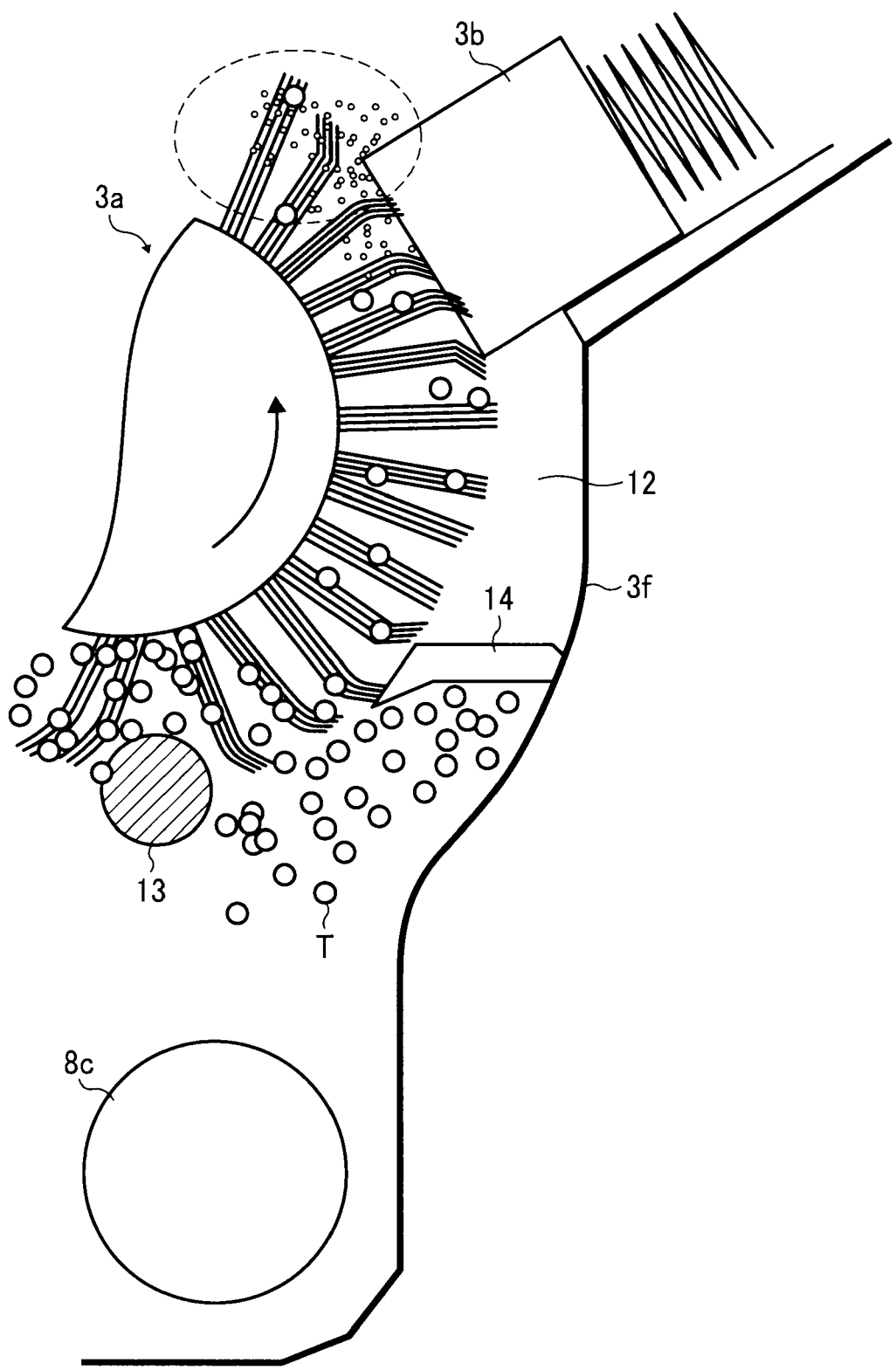
FIG. 6 is a partially enlarged view of a variation of the lubricant applicator.
Figure 7:
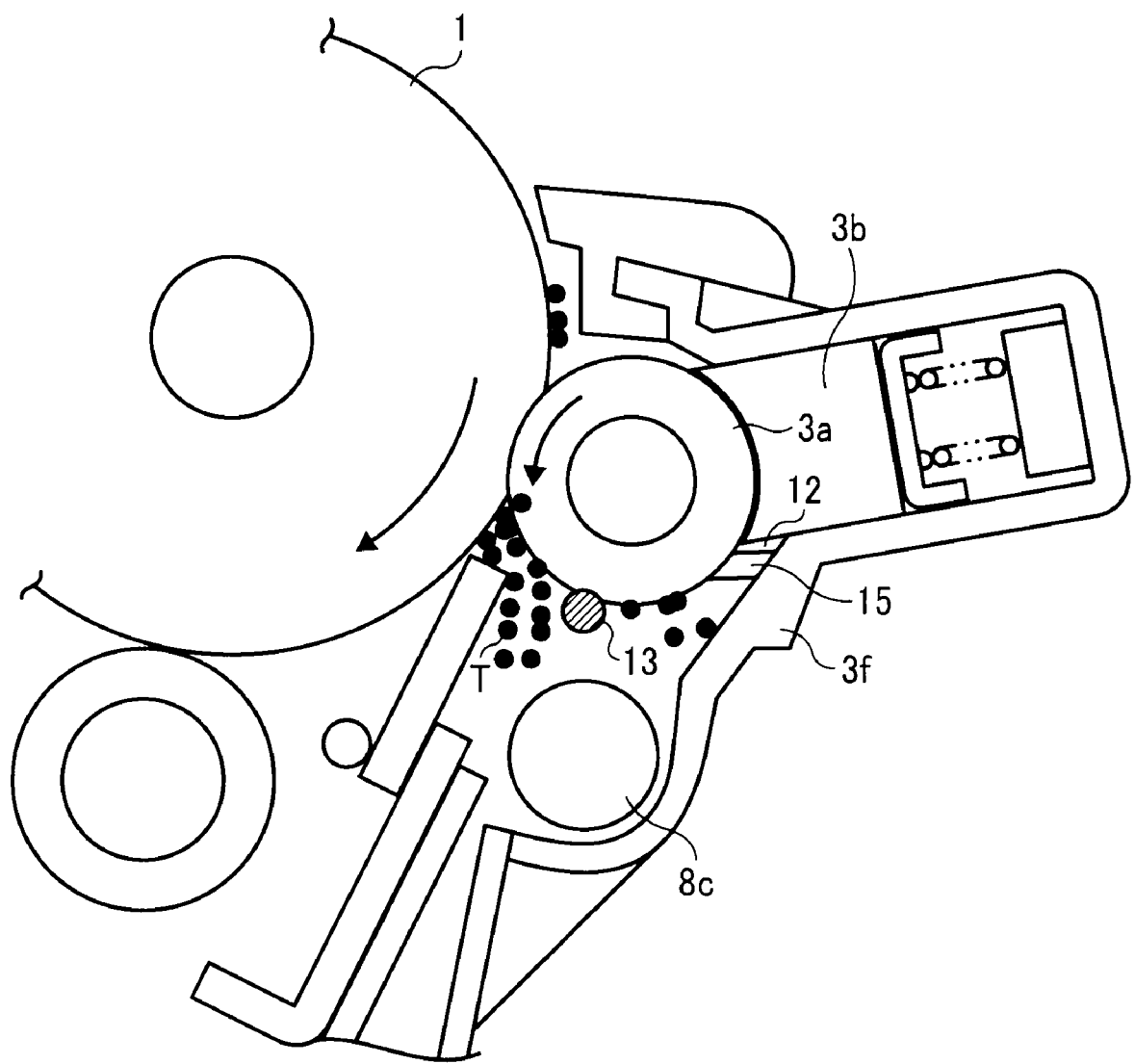
FIG. 7 is a cross-sectional view of another variation of the lubricant applicator.

With reference to FIGS. 6 and 7, a description is provided of a variation of the foregoing embodiment.

FIG. 6 is a schematic diagram illustrating a stick-type flicker 13 and an adherence prevention member 14. FIG. 7 is a schematic diagram illustrating a variation of the lubricant applicator of FIG. 6.

As illustrated FIGS. 6 and 7, the lubricant applicator includes a flicker 13 and an adherence prevention member 14 or an adherence prevention member 15 provided between the flicker 13 and the solid lubricant 3b. The flicker 13 is a stick member. The adherence prevention member 14 or 15 prevents the toner removed from the flicker 13 from adhering again to the roller brush 3a.

In FIG. 6, the lubricant applicator includes the flicker 13 provided substantially below the brush roller 3a and the adherence prevention member 14 provided substantially at the same height as that of the flicker 13.

The lubricant applicator shown in FIG. 7 includes the flicker 13 substantially below the brush roller 3a. The adherence prevention member 15 is provided immediately next to the solid lubricant 3b.

The adherence prevention members 14 and 15 are separate parts from the housing 3f and attached to the housing 3f of the lubricant applicator. However, the adherence prevention members 14 and 15 can be integrally formed with the housing 3f, thereby constituting a single integrated unit. With this configuration, the number of parts can be reduced.

In the lubricant applicator according to the present embodiment, the adherence prevention members 14 and 15 seal the space 12 defined by the brush roller 3a, the housing 3f, and the solid lubricant 3b. Accordingly, the toner T removed by the flicker 13 is prevented from migrating to the solid lubricant, thereby allowing the brush roller 3a to scrape the solid lubricant 3b with less toner adhered thereto. Furthermore, after the lubricant is scraped and obtained in powder form, the brush roller 3a can easily carry the lubricant (indicated by the dotted oval in FIG. 6). As a result, the lubricant can be efficiently applied to the photoreceptor drum 1.

Figure 8:
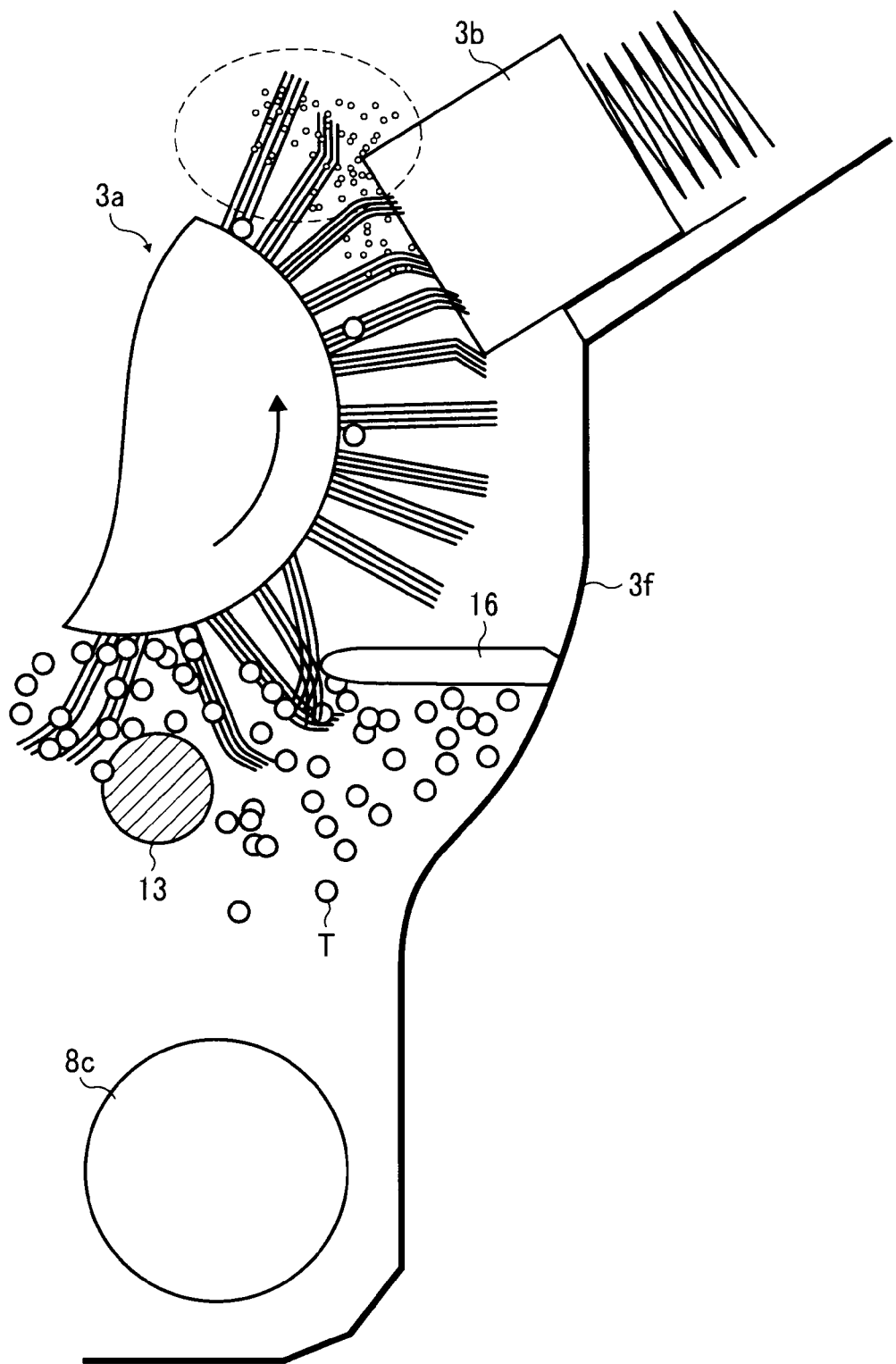
FIG. 8 is a partially enlarged view of still another variation of the lubricant applicator.

Referring now to FIG. 8, there is provided a partially enlarged view of a variation of the foregoing embodiment. As illustrated in FIG. 8, a tip portion of an adherence prevention member 16 is projected into bristles of the brush roller 3a so as to reduce the toner adhering to the contact portion of the brush roller 3a contacting the solid lubricant 3b.

With this configuration, the residual toner remaining on the brush roller 3a even after the flicker 13 removes the toner can be removed by the adherence prevention member 16 projecting into the bristles of the brush roller 3a. Therefore, it is possible to reduce the amount of toner remaining in the contact portion between the solid lubricant 3b and the brush roller 3a.

Figure 9:
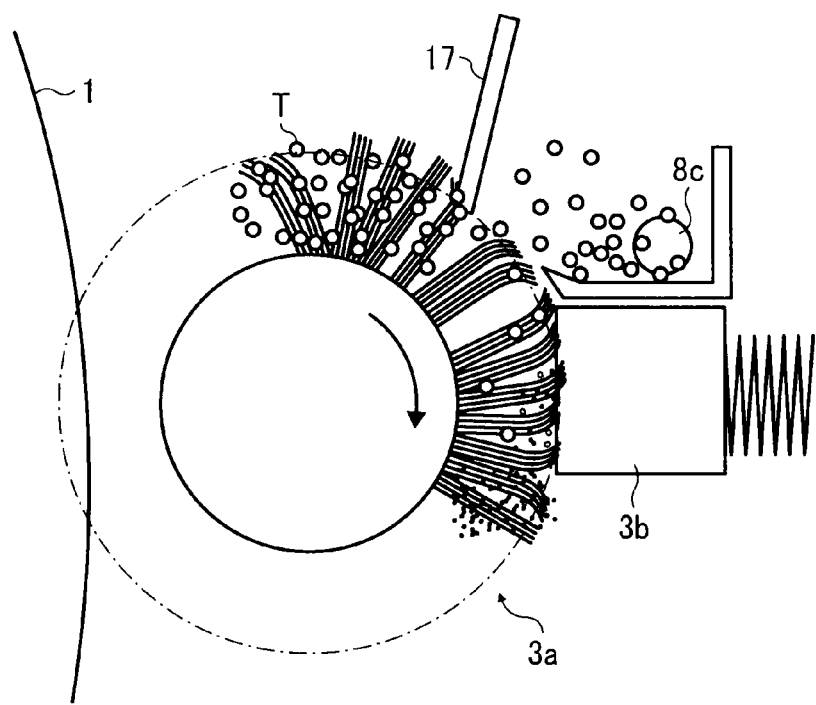
FIG. 9 is a partially enlarged view of still yet another variation of the lubricant applicator.

Referring now to FIG. 9, there is provided a partially enlarged view of a variation of the foregoing embodiment. As illustrated in FIG. 9, the brush roller 3a rotates in the direction opposite the direction in the foregoing embodiments illustrated in FIGS. 5 through 8. According to the present embodiment, a tip portion of a plate-shape adherence prevention member 17 is projected into bristles of the brush roller 3a.

The waste toner conveyance screw 8c of the cleaning device 8 is provided downstream of the adherence prevention member 17 (in the direction of rotation of the brush roller 3a). With this configuration, if the brush roller 3a rotates in the opposite direction, the toner in the brush can still be removed.

Figure 10:
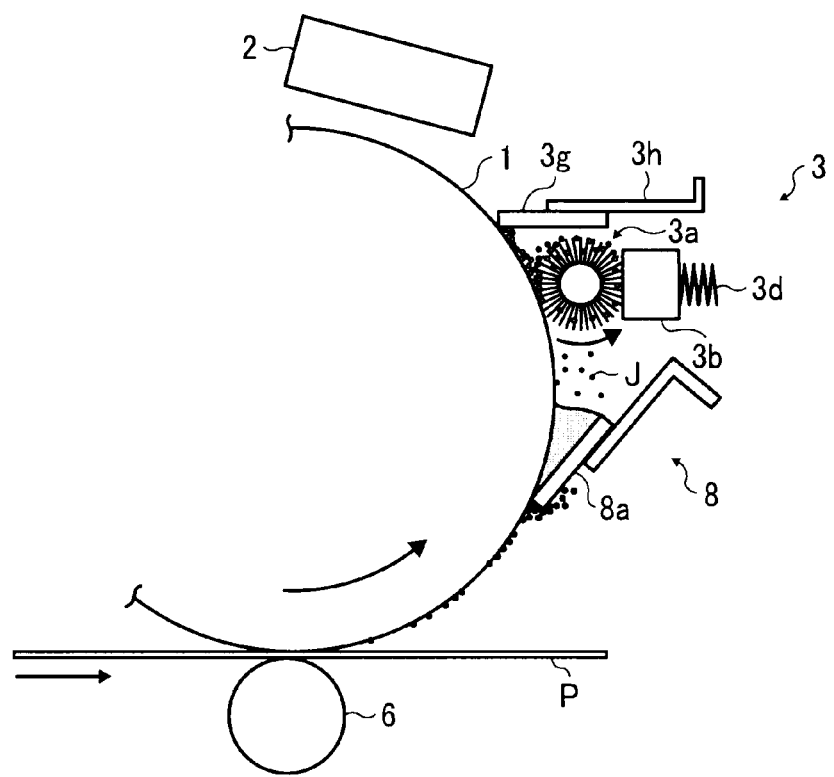
FIG. 10 is a cross-sectional view of the vicinity of a photoreceptor drum of an image forming apparatus using a direct transfer method.

The foregoing description pertains to a lubricant applicator that uses an application roller (the brush roller). Alternatively, the lubricant applicator may use a blade. In such a case, a configuration as illustrated in FIG. 10 is employed. As illustrated in FIG. 10, the lubricant applicator 3 includes a blade 3g. When the blade 3g is employed as the lubricant application member, the lubricant applied to the photoreceptor drum 1 can be smoothened.

Embodiment 2

Referring now to FIG. 10, there is provided a partially enlarged view of the vicinity of the photoreceptor drum 1 of one example of an image forming apparatus using a direct transfer method.

In FIG. 10, the charging device 2, the lubricant applicator 3, the cleaning device 8, a transfer roller 6, and so forth are disposed around the photoreceptor drum 1.

The recording medium P is transported from the left to the right in FIG. 10 between the photoreceptor drum 1 and the transfer roller 6. The toner image on the photoreceptor drum 1 is transferred onto the recording medium.

The lubricant applicator 3 includes the lubricant application roller 3a, the solid lubricant 3b, a pressure member 3d, the application blade 3g, a support member 3h, and so forth.

The solid lubricant 3b is pressed against the application roller 3a (brush roller), serving as the lubricant application member. As the brush roller 3a rotates, the brush roller 3a scrapes the solid lubricant, thereby obtaining the lubricant in powder form. The brush roller 3a contacts the surface of the photoreceptor drum 1 to apply the powder lubricant on the surface of the photoreceptor drum 1 while rotating. When the lubricant is applied to the photoreceptor drum 1, a thin layer is formed thereon, thereby reducing a friction coefficient.

The solid lubricant 3b is always formed into powder form by the brush roller 3a and continuously applied to the photoreceptor drum 1. Consequently, depending on the condition of the photoreceptor drum 1, the toner may be excessively applied thereto. In such a case, a lubricant J in powder form is not completely applied to the photoreceptor drum 1, thus remaining within the image forming unit. When this happens, the residual powder lubricant J scatters and falls when the lubricant applicator is replaced.

The particle diameter of the residual powder lubricant J is substantially small and thus the residual powder lubricant J accumulates freely in the device. For example, as illustrated in FIG. 10, the powder lubricant J accumulates on the cleaning blade 8a and/or at a corner between the photoreceptor drum 1 and the cleaning blade 8a, that is, a cuneal portion between the photoreceptor drum 1 and the cleaning blade 8a in FIG. 10.

In this case, depending on an amount of accumulation, the accumulated powder lubricant pushes the cleaning blade 8a, preventing the cleaning blade 8a from contacting the photoreceptor drum 1.

To counteract such a difficulty, according to EMBODIMENT 2, a lubricant receiver 31 is provided to a lubricant applicator 30 as illustrated in FIG. 11. FIG. 11 is a partially enlarged view of the vicinity of the photoreceptor drum 1 according to the present embodiment. The lubricant receiver 31 blocks the space between the application roller 3a or the lubricant application member and the cleaning device 8 so as to regulate a place at which the residual lubricant J in powder form accumulates over time.

With reference to FIG. 11, a detailed description of the lubricant applicator 30 is provided. Similar to the lubricant applicator 3 of EMBODIMENT 1, the lubricant applicator 30 of the present embodiment includes the lubricant application roller 3a, the solid lubricant 3b, and the pressure member 3b. In addition, the lubricant applicator 30 includes the application blade 3g held by the support member 3h. Furthermore, the lubricant applicator 30 includes the lubricant receiver 31. The lubricant receiver 31 is a sheet member and disposed such that it blocks the space between the lubricant applicator 30 and the cleaning device 8.

According to the present embodiment, the residual powder lubricant J that is not applied to the photoreceptor drum 1 thus remaining in the image forming unit 10 is prevented from accumulating on the cleaning device 8 including the cleaning blade 8a and the support member 8b and/or the space between the cleaning blade 3g and the photoreceptor drum 1. Instead, the residual powder lubricant J accumulates on the lubricant receiver 31. Accordingly, the photoreceptor drum 1 can be reliably and stably cleaned over time.

According to the present embodiment, the application brush 3a that is a rotary member is used as a lubricant application member. However, the present invention is not limited to the brush member. As long as the lubricant application member is a rotary member that scrapes the solid lubricant, contacts the photoreceptor drum (the image bearing member), and applies the scraped lubricant in powder form to the photoreceptor drum, material is not limited to a brush.

Although the lubricant applicator 30 includes the application blade 3g, the similar, if not the same effects can be achieved without the application blade 3g.

According to the present embodiment, the spring 3d is used as a pressure member for pressing the solid lubricant 3b. However, as long as the solid lubricant 3d is pressed against the lubricant application member, a method of pressing the solid lubricant 3b is not limited to a spring.

As described above, when the lubricant applicator 30 includes the sheet-type lubricant receiver 31, the residual lubricant J is prevented from accumulating on the cleaning device 8 and/or the space between the cleaning device 8 an the photoreceptor drum 1. However, as illustrated in FIG. 12A, in a case in which the tip of the lubricant receiver 31 does not contact the photoreceptor drum 1, the powder residual lubricant accumulated on the lubricant receiver 31 drops little by little from the gap between the lubricant receiver 31 and the photoreceptor drum 1 and accumulates on the cleaning blade 8*a* and/or between the cleaning blade 8*a* and the photoreceptor drum 1.

In view of the above, it is desirable that the tip of the lubricant receiver 31 contact the photoreceptor drum 1.

If the lubricant receiver 31 is formed of urethane or the like, as the amount of accumulated powder lubricant J on the lubricant receiver 31 increases, the lubricant receiver 31 flexes downward due to the weight of the accumulated powder lubricant as illustrated in FIG. 12B. Consequently, a gap is formed between the photoreceptor drum 1 and the lubricant receiver 31. Through the gap, the powder lubricant drops little by little, accumulating on the cleaning blade 8*a* and the space between the cleaning blade 8*a* and the photoreceptor drum 1.

In view of the above, as illustrated in FIG. 12C, the lubricant receiver 31 includes a sheet member 32 formed of urethane or the like and a support member 33 formed of metal. The sheet member 32 is supported by the support member 33 formed of rigid material.

As illustrated in FIG. 12C, the tip of the sheet member 32 contacts the photoreceptor drum 1, and the support member 33 includes a bent portion. According to the present embodiment, a portion of the support member 33 is bent at approximately 90 degrees.

With this configuration, the lubricant receiver 31 can resist the weight of the powder lubricant to some degree and a margin of deformation is enhanced. Furthermore, when the support member 33 includes the bent portion, the lubricant receiver 31 as a whole constitutes a V-shape, thereby allowing the powder lubricant J to fall on the portion of the lubricant receiver 31 that is relatively far from the photoreceptor drum 1, that is, the bottom of the V-shape portion. Accordingly, the accumulated powder lubricant J on the lubricant receiver 31 is prevented from falling and accumulating on the cleaning device 8 and/or the space between the cleaning blade 8*a* and the photoreceptor drum 1 over time.

As described above, the lubricant receiver 31 includes the support member 33 and the sheet member 32 together forming the V-shape. The cross-section of the support member 33 has a V-shape. The sheet member 32 made of urethane or the like is attached to one side of the V-shape. The sheet member 32 can be attached to the V-shape support member 33 using a known method, for example, using an adhesive.

As long as the photoreceptor drum 1 and the support member 33 do not contact each other, that is, only the sheet member 32 made of urethane or the like contacts the photoreceptor drum 1, an overlapped width between the sheet member 32 and the support member 33 is not limited. Furthermore, the material for the support member 33 is not limited to metal. Any other suitable material having a proper rigidity is used.

The lubricant applicator 30 of the present embodiment includes the sheet-type lubricant receiver 31 that blocks the space between the cleaning device and the lubricant applicator. Thus, the number of parts increases compared to other embodiments, thus increasing operation tasks upon assembly, replacement of the blade, and replacement of the image forming unit. Because the powder lubricant accumulates on the lubricant receiver 31, the powder lubricant falls and/or scatters when performing replacement.

In view of this, it is advantageous to integrally provide the lubricant receiver 31 with the cleaning device. As illustrated in FIG. 11 and FIG. 12C, the lubricant receiver 31 is attached to the support member 8*b* of the cleaning blade 8*a* so as to constitute a single integrated unit.

With this configuration, when the cleaning blade 8*a* is attached or detached, the lubricant receiver 31 is attached or detached together with the cleaning blade 8*a*, thereby reducing the number of operation tasks. Furthermore, even if the powder lubricant is accumulated, the support member 8*b* of the cleaning blade 8*a* serves as a wall, thereby preventing the powder lubricant from falling and/or scattering, compared to removing the lubricant receiver 31 alone.

In order to constitute the lubricant receiver 31 and the cleaning device 8 as a single integrated unit, the lubricant receiver 31 is attached to the cleaning device 8 by known attachment methods. The attachment methods include, but are not limited to known methods such as using adhesive material such as a double-sided tape and using a screw.

Figure 13:
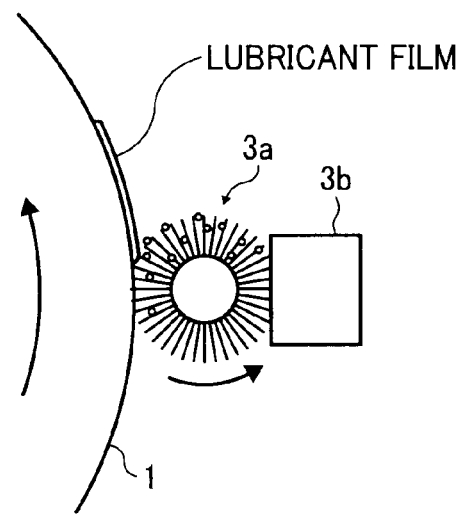
FIG. 13 is a partially enlarged view illustrating a brush roller of the lubricant applicator according to the second embodiment of the present invention.
Figure 13:
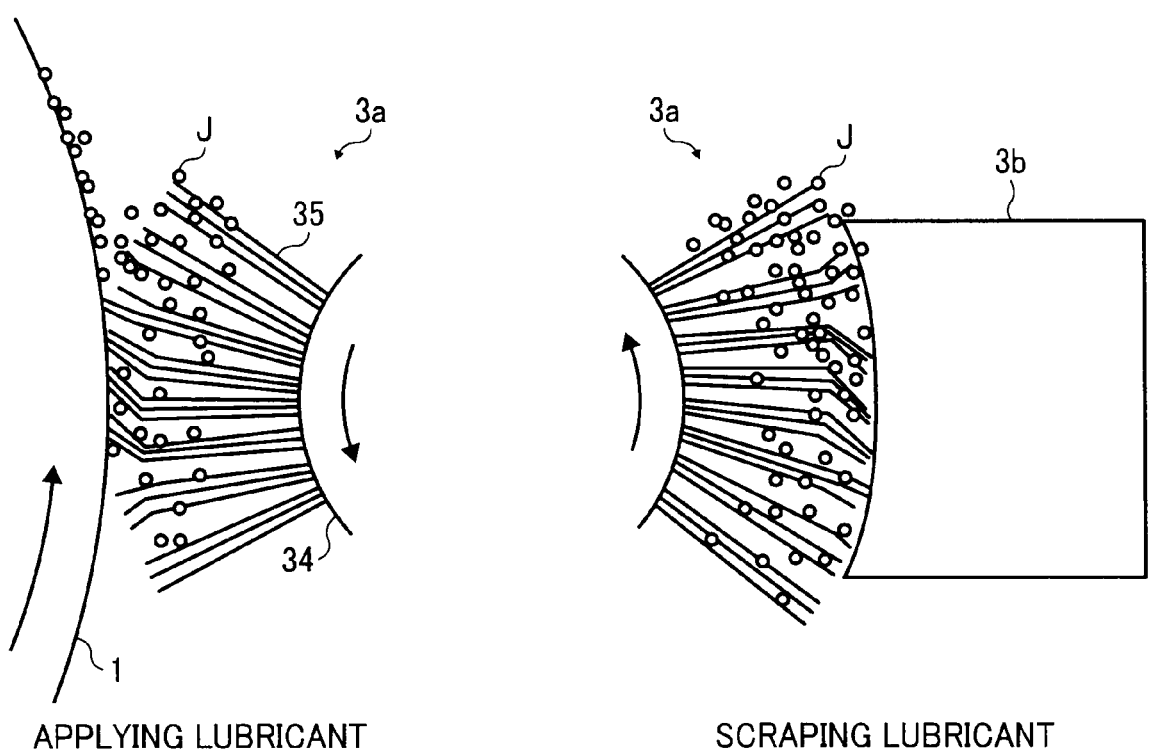

Referring now to FIG. 13, there is provided a partially enlarged view of the brush roller 3*a*. As illustrated in FIG. 13, the brush roller 3*a* includes a shaft 34 and brush bristles 35. The base of brush bristles 35 are fixed to the shaft 34.

The brush roller 3*a* is disposed substantially parallel to the photoreceptor drum 1 and extends along the photoreceptor drum 1. Both ends of the shaft 34 are rotatably supported through shaft bearings.

The brush roller 3*a* is driven by a different drive source from the photoreceptor drum 1. The brush roller 3*a* is rotated in the counter direction relative to the direction of rotation of the photoreceptor drum 1.

Multiple brush bristles 35 scrape the solid lubricant 3*b*, thereby obtaining the powder lubricant J. The brush bristles 35 carry the powder lubricant J and apply the lubricant J to the photoreceptor drum 1.

The powder lubricant J forms a thin film layer on the surface of the photoreceptor drum 1, thereby reducing the friction coefficient of the photoreceptor drum 1 and protecting the surface of the photoreceptor drum 1.

If the particle diameter of the powder lubricant J is large and irregular, the thin film layer cannot be formed evenly on the surface of the photoreceptor drum 1. However, if the lubricant applicator uses the brush roller, the brush bristles can evenly and finely scrape the solid lubricant.

Figure 14:
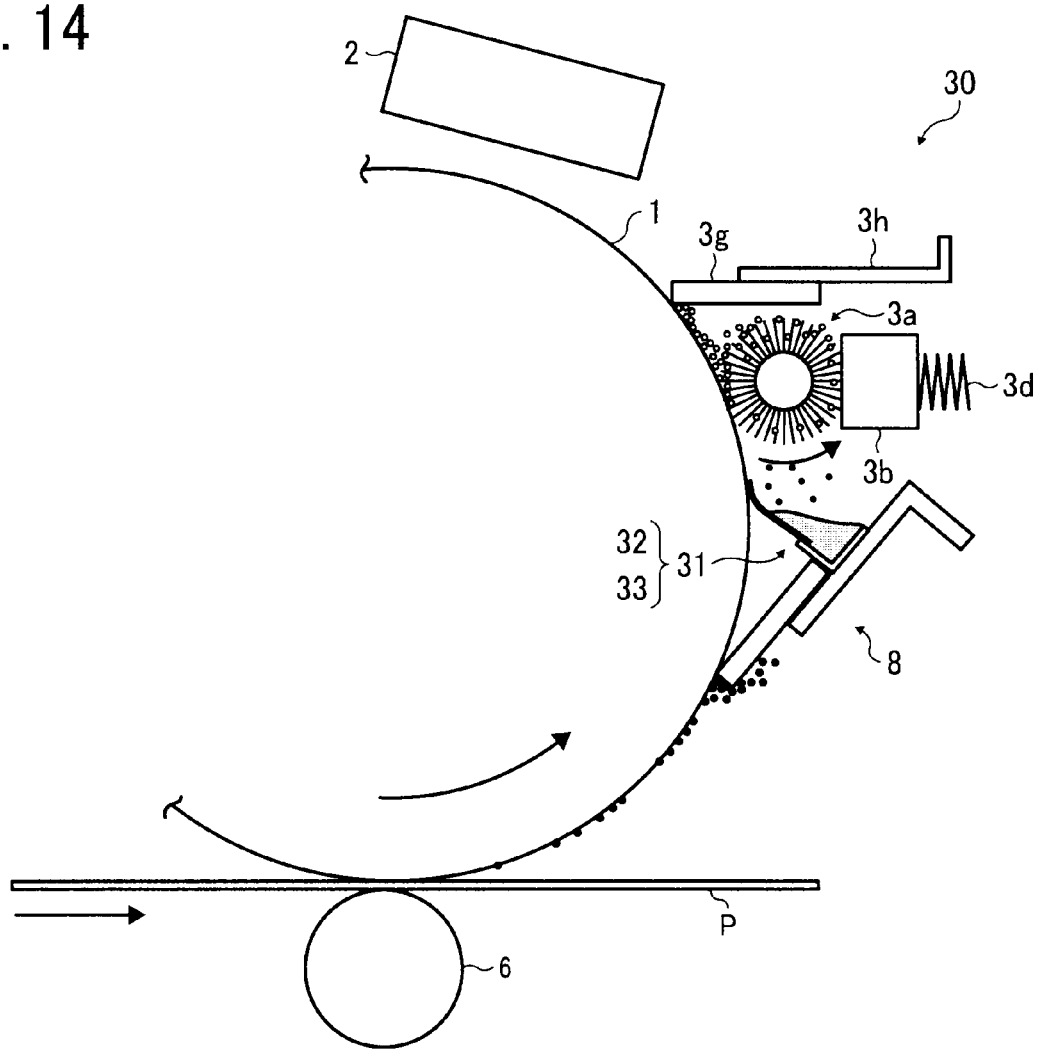
FIG. 14 is a cross-sectional view of the lubricant applicator using both the brush roller and an application blade according to the second embodiment of the present invention.

Referring now to FIG. 14, there is provided a partially enlarged view of the lubricant applicator using both the brush roller and the blade for application of the lubricant.

As illustrated in FIG. 14, the lubricant applicator 30 includes the lubricant application roller 3*a*, the solid lubricant 3*b*, the pressure member 3*d*, the application blade 3*g* held by the support member 3*h*. Further, the sheet-type lubricant receiver 31 is disposed so as to block the space between the lubricant applicator 30 and the cleaning device 8.

Similar to the configuration shown in FIG. 12C, the sheet member 32 and the support member 33 constitute the lubricant receiver 31. The support member 33 includes the bent portion.

Similar to the cleaning blade 8*a*, the application blade 3*g* is formed of an elastic member such as rubber. The base of the application blade 3*g* is fixed to the support member 3*h* by adhesive or the like.

The tip of the application blade 3*g* contacts the photoreceptor drum 1 so as to evenly apply the powder lubricant applied by the brush roller 3*a* on the surface of the photoreceptor drum 1. The application blade 3g contacts the photoreceptor drum 1 in a forward direction relative to the rotation of photoreceptor drum 1.

The application blade 3g is disposed downstream of the brush roller 3a serving as the lubricant application member relative to the direction of rotation of the photoreceptor drum 1, thereby pressing the powder lubricant. With this configuration, the lubricant is evenly applied to the photoreceptor drum 1, and the thin film layer of the lubricant can be formed evenly thereon in the longitudinal direction.

Figure 15:
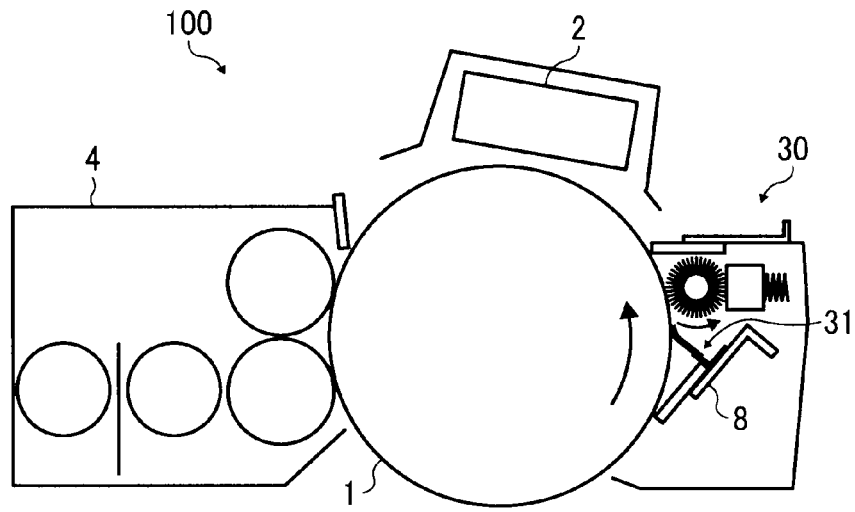
FIG. 15 is a cross-sectional view of an example of a process cartridge (an image forming unit) including the lubricant applicator of the second embodiment of the present invention.

Referring now to FIG. 15, there is provided a cross-sectional view of one example of an image forming unit 100 serving as a process cartridge including the lubricant applicator 30 of EMBODIMENT 2.

As illustrated in FIG. 15, the image forming unit 100 includes the photoreceptor drum 1, the developing device 4, the lubricant applicator 30, the cleaning device 8, and so forth. The developing device 4, the lubricant applicator 30, and the cleaning device 8 are disposed around the image forming unit 100.

The lubricant applicator 30 is the same as the lubricant applicator illustrated in FIG. 14. When the image forming unit 100 or the process cartridge is mounted in the image forming apparatus main body, the photoreceptor drum 1 is rotated in the counterclockwise direction in FIG. 15, and the brush roller 3a of the lubricant applicator 30 is rotated in the counter direction relative to the photoreceptor drum 1.

In general, the structure of the image forming apparatus of electrophotography is relatively complicated, thereby complicating replacement of parts and components constituting the apparatus. By contrast, in the image forming unit according to the illustrative embodiments, components that are subjected to replacement are formed as a single integrated unit constituting the process cartridge. Accordingly, replacement is performed with ease, thereby enhancing maintenance performance.

In FIG. 15, one image forming unit or the process cartridge 100 is illustrated. However, the image forming apparatus may include a plurality of the image forming units 100 arranged next to each other so as to form a multicolor image. The illustrative embodiments can be applied to an image forming apparatus using a direct transfer method or an intermediate transfer method.

The configuration of the present invention is not limited to the configuration described above. The lubricant applicator includes, but is not limited to the brush roller, a sponge roller or the like.

The composition of the solid lubricant is not limited to the composition described above. Any other appropriate composition can be used.

The pressure mechanism that presses the solid lubricant against the lubricant application mechanism is not limited to a spring. Any other appropriate pressure mechanism can be used. Alternatively, the lubricant applicator may use a self weight of the solid lubricant.

Furthermore, any appropriate drive mechanism can be used for driving the application roller serving as the lubricant application mechanism.

Features such as the shape and the size of the flicker or the adherence prevention member of EMBODIMENT 1 are not limited to the configuration described above, and are changeable within the scope of this disclosure and appended claims.

Furthermore, features such as the shape and the size of the lubricant receiver of EMBODIMENT 2 are not limited to the configuration described above, but are changeable within the scope of this disclosure and appended claims. The material constituting the lubricant receiver is not limited the configuration described above. Any other appropriate material can be used.

The components to be mounted in the process cartridge including the lubricant receiver are not limited to the configuration described above. Any other appropriate components can be mounted to the process cartridge within the scope of this disclosure and appended claims. The image bearing member serving as a photoreceptor is not limited to a drum. Alternatively, a belt-type image bearing member can be used.

The configuration of the image forming unit of the image forming apparatus is not limited to the configuration described above. The arrangement of the image forming units in the tandem-type image forming apparatus can be arbitrary.

The image forming apparatus is not limited to the tandem-type. Alternatively, a plurality of the developing devices can be disposed around a single photoreceptor drum.

The present invention can be applied to a full-color image forming apparatus using three colors of toner. The present invention can be applied to a two-color image or a monochrome image forming apparatus.

The image forming apparatus includes, but is not limited to, a printer, a copier, a facsimile machine, and a digital multi-functional system having two or more functions thereof.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Still further, any one of the above-described and other exemplary features of the present invention may be embodied in the form of an apparatus, method, or system.

For example, any of the aforementioned methods may be embodied in the form of a system or device, including, but not limited to, any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. A lubricant applicator, comprising:
    a solid mold lubricant;
    a lubricant application roller to scrape and apply the lubricant to an image bearing member;
    a flicker member to remove a powder substance adhered to the surface of the lubricant application roller, the flicker member disposed upstream of the solid mold lubricant in a direction of rotation of the lubricant application roller; and
    an adherence prevention member to prevent the substance removed by the flicker member from adhering again to the lubricant application roller, the adherence prevention member disposed between the flicker member and the solid mold lubricant.

2. The lubricant applicator according to claim 1, wherein the lubricant application roller is a brush roller.

3. The lubricant applicator according to claim 1, wherein the solid mold lubricant is formed of one of fluorocarbon resin fatty acid and metal salts.

4. The lubricant applicator according to claim 1, further comprising an application blade to contact the image bearing member to apply the lubricant.

5. The lubricant applicator according to claim 1, further comprising a housing, wherein the flicker member is provided as a single integrated unit with the housing of the lubricant applicator.

6. The lubricant applicator according to claim 1, wherein the flicker member is provided as a separate body from the lubricant applicator.

7. The lubricant applicator according to claim 1, wherein
  the adherence prevention member is disposed upstream from the solid mold lubricant in the direction of rotation of the lubricant application roller, and
  the lubricant application roller, the flicker member, and the solid mold lubricant define a sealed space therebetween.

8. The lubricant applicator according to claim 1, wherein a tip portion of the adherence prevention member is projected into the lubricant application roller.

9. A process cartridge detachably mountable relative to an image forming apparatus, comprising:
  an image bearing member to bear an electrostatic latent image; and
  the lubricant applicator of claim 1.

10. An image forming apparatus according to claim 9, comprising one of the lubricant applicator of and the process cartridge.

11. The image forming apparatus according to claim 10, further comprising a plurality of image forming units, each of which including the process cartridge, to form a multicolor image.

12. The image forming apparatus according to claim 10, wherein a circularity of toner to form the image is equal to or greater than 0.95.

13. The lubricant applicator according to claim 1, wherein the adherence prevention member is provided at a substantially same height as the flicker member.

14. A process cartridge detachably mountable relative to an image forming apparatus, comprising:
  an image bearing member to bear an electrostatic latent image;
  a cleaning device to clean the image bearing member, the cleaning device including a cleaning blade and a support member that holds the cleaning blade; and
  a lubricant applicator,
  wherein the lubricant applicator, comprises:
    a solid mold lubricant;
    a lubricant application roller to scrape and apply the lubricant to an image bearing member; and
    a lubricant receiver to receive the scraped lubricant from the lubricant application roller to regulate accumulation of the lubricant, disposed substantially below the lubricant application roller, and
  wherein the lubricant receiver of the lubricant applicator is attached to one of the cleaning blade and the support member.

15. The lubricant applicator according to claim 14, wherein a tip portion of the lubricant receiver contacts the image bearing member.

16. The lubricant applicator according to claim 14, wherein the lubricant receiver has elasticity.

17. The lubricant applicator according to claim 14, wherein the lubricant receiver is supported by a rigid support member.

18. The lubricant applicator according to claim 17, wherein the support member includes a bent portion.

19. The lubricant applicator according to claim 14, wherein the lubricant receiver is disposed substantially above a cleaning device that cleans the image bearing member.

* * * * *